(12) United States Patent
Osaki et al.

(10) Patent No.: US 11,977,433 B2
(45) Date of Patent: May 7, 2024

(54) FAILURE AREA IDENTIFICATION SYSTEM

(71) Applicant: Hitachi, Ltd., Tokyo (JP)

(72) Inventors: Hiroyuki Osaki, Los Gatos, CA (US); Tomohiro Kawaguchi, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/954,119

(22) Filed: Sep. 27, 2022

(65) Prior Publication Data

US 2024/0103949 A1    Mar. 28, 2024

(51) Int. Cl.
*G06F 11/00* (2006.01)
*G06F 11/07* (2006.01)

(52) U.S. Cl.
CPC ...... *G06F 11/0751* (2013.01); *G06F 11/0721* (2013.01)

(58) Field of Classification Search
CPC .................................................. G06F 11/0751
See application file for complete search history.

(56) References Cited

U.S. PATENT DOCUMENTS

| | | | | |
|---|---|---|---|---|
| 6,084,732 A * | 7/2000 | Lee | ........... | G11B 27/36 |
| | | | | 360/48 |
| 6,147,827 A * | 11/2000 | Southerland | ........... | G11B 27/36 |
| 7,206,990 B2 * | 4/2007 | Su | ........... | G11B 20/1816 |
| 7,409,512 B1 * | 8/2008 | Kekre | ........... | G06F 11/2082 |
| | | | | 711/161 |
| 7,409,951 B1 * | 8/2008 | Benavides | ........... | F41B 11/68 |
| | | | | 124/56 |
| 9,411,678 B1 * | 8/2016 | Ware | ........... | G06F 11/1008 |
| 9,495,988 B1 * | 11/2016 | Liu | ........... | G11B 5/09 |
| 10,733,042 B2 * | 8/2020 | Gao | ........... | G06F 3/0619 |
| 2010/0122148 A1 * | 5/2010 | Flynn | ........... | G11C 16/3422 |
| | | | | 714/E11.034 |
| 2014/0047263 A1 | 2/2014 | Coatney et al. | | |
| 2014/0081919 A1 | 3/2014 | Matsumoto et al. | | |
| 2015/0143185 A1 * | 5/2015 | Motwani | ........... | G11C 29/44 |
| | | | | 714/718 |
| 2018/0011728 A1 | 1/2018 | Nasu et al. | | |
| 2018/0107553 A1 * | 4/2018 | Leggette | ........... | G06F 3/064 |
| 2018/0365118 A1 * | 12/2018 | Fujihara | ........... | G06F 3/0619 |
| 2022/0035699 A1 * | 2/2022 | Singhai | ........... | H03M 13/356 |

* cited by examiner

*Primary Examiner* — Amine Riad
(74) *Attorney, Agent, or Firm* — Procopio, Cory, Hargreaves & Savitch LLP

(57) ABSTRACT

Aspects of the present disclosure involve an innovative method for detecting error zones from a plurality of volume groups. The method may include creating a plurality of probe groups for error detection; detecting a new error associated with the plurality of probe groups and the plurality of volume groups; retrieving error information associated with the new error, wherein the error information comprises an error source, an error type, and an error time; retrieving an error correlation rule associated with the error information; determining if the error correlation rule is satisfied by the error information and information of other known errors; and identifying a common zone based on the error information and the information of the other known errors as an error zone.

15 Claims, 8 Drawing Sheets

1202

|  | P count | S count | Path count |
|---|---|---|---|
| Z1 | 2 | 1 | - |
| Z2 | 3 | 2 | - |
| Z3 | 2 | 0 | - |
| Z4 | 2 | 2 | - |
| R1 | 5 | 3 | - |
| R2 | 2 | 0 | - |
| R3 | 2 | 2 | - |
| PTH1 | - | - | 2 |
| PTH2 | - | - | 2 |
| PTH3 | - | - | 3 |

1205

| group | group type | P | S | path |
|---|---|---|---|---|
| GROUPA | p/s | Z3 | Z1 | PTH1 |
| GROUPB | p/s | Z4 | Z1 | PTH2 |
| GROUPC | p/s | Z3 | Z4 | PTH3 |
| GROUPD | p/s | Z4 | Z2 | PTH2 |

1201

| group | group type | P | S | path |
|---|---|---|---|---|
| GROUPA | p/s | Z3 | Z1 | PTH1 |
| GROUPC | p/s | Z3 | Z4 | PTH3 |
| GROUPD | p/s | Z4 | Z2 | PTH2 |

1203

| Volume type | Minium number |
|---|---|
| P | 2 |
| S | 2 |
| path | 2 |

1204

| group | P | S | path |
|---|---|---|---|
| GROUPA | Z3 | Z1 | PTH1 |
| GROUPB | Z4 | Z1 | PTH2 |

FIG. 12

FAILURE AREA IDENTIFICATION SYSTEM

BACKGROUND

Field

The present disclosure is generally directed to a method and a system for detecting error zones from a plurality of volume groups.

Related Art

Recent computing systems are built on the cloud environment. The cloud environment has a hierarchical structure of regions and availability zones. FIG. 1 illustrates a conventional disaster recovery system. As illustrated in FIG. 1, each region comprises one or more availability zone. For example, region 101a may include availability zones 102a and 102b, and region 101b may include an availability zone 102c. Availability zone 102a may include a storage node 103a, and availability zone 102c may include a storage node 103b. Both regions and availability zones are area units which can be impacted from a failure incident. For example, a failure affecting region 101a could make both availability zones 102a and 102b become unavailable. Storage admin 100 may create the storage nodes and volumes associated with the storage nodes.

Volumes in different storage nodes, such as volume 105a and volume 105b, are grouped as a volume group (volume group 106), and data in these volumes is replicated to each other. When one of the volumes in the group is accidentally destroyed or deleted by a disaster, the remaining volume would still have complete data. In most cases, volume groups assign a different volume label to each volume which distinguishes the volumes in a volume group by such designations as primary (P) and secondary (S). As illustrated in FIG. 1, volumes 105a and 105b form a volume group 106. The volume group 106 may use any of available paths 104a and 104b to communicate between volumes 105a and 105b. Paths are also area units which can be impacted from a failure incident.

Storage admin must avoid unhealthy areas (availability zone, region, or path) in creating volume groups in the cloud environment. However, it can be difficult for the storage admin to identify which of the regions or availability zones is unhealthy. This is because storage nodes or volume groups created by the storage admin are only capable of detecting their own errors and are unable to identify failure areas outside the created storage nodes or volumes. Taking FIG. 1 as an example, if the storage admin 100 manages the volume group 106 consisting of volumes 105a and 105b, the volume group 106 can detect errors of associated with volumes 105a and 105b. However, the volume group 106 cannot identify which of the surrounding regions 101a and 101b, surrounding availability zones 102a and 102c, or communicating paths 104a and 104b is the failure area. This prevents storage admin 100 from creating safe volume groups even after detecting some errors.

In the related art, file system duplication, storage resource determination, and switchover operations are utilized without giving consideration of area hierarchy such as region or availability zone. Moreover, they provide no means for identification of failure areas in cloud environment.

SUMMARY

Aspects of the present disclosure involve an innovative method for detecting error zones from a plurality of volume groups. The method may include creating a plurality of probe groups for error detection; detecting a new error associated with the plurality of probe groups and the plurality of volume groups; retrieving error information associated with the new error, wherein the error information comprises an error source, an error type, and an error time; retrieving an error correlation rule associated with the error information; determining if the error correlation rule is satisfied by the error information and information of other known errors; and identifying a common zone based on the error information and the information of the other known errors as an error zone.

Aspects of the present disclosure involve an innovative non-transitory computer readable medium, storing instructions for detecting error zones from a plurality of volume groups. The instructions may include creating a plurality of probe groups for error detection; detecting a new error associated with the plurality of probe groups and the plurality of volume groups; retrieving error information associated with the new error, wherein the error information comprises an error source, an error type, and an error time; retrieving an error correlation rule associated with the error information; determining if the error correlation rule is satisfied by the error information and information of other known errors; and identifying a common zone based on the error information and the information of the other known errors as an error zone.

Aspects of the present disclosure involve an innovative server system for detecting error zones from a plurality of volume groups. The server system may include creating a plurality of probe groups for error detection; detecting a new error associated with the plurality of probe groups and the plurality of volume groups; retrieving error information associated with the new error, wherein the error information comprises an error source, an error type, and an error time; retrieving an error correlation rule associated with the error information; determining if the error correlation rule is satisfied by the error information and information of other known errors; and identifying a common zone based on the error information and the information of the other known errors as an error zone.

Aspects of the present disclosure involve an innovative system for detecting error zones from a plurality of volume groups. The system can include means for creating a plurality of probe groups for error detection; means for detecting a new error associated with the plurality of probe groups and the plurality of volume groups; means for retrieving error information associated with the new error, wherein the error information comprises an error source, an error type, and an error time; retrieving an error correlation rule associated with the error information; means for determining if the error correlation rule is satisfied by the error information and information of other known errors; and means for identifying a common zone based on the error information and the information of the other known errors as an error zone.

Aspects of the present disclosure involve an innovative method for detecting error zones. The method may include creating a plurality of probe groups by iteratively creating a probe group when a volume group of a plurality of volume groups is deleted or created, wherein each of the plurality of probe groups comprises a primary volume, a secondary volume, and a path; detecting a new error associated with the plurality of probe groups and the plurality of volume groups; retrieving error information associated with the new error, wherein the error information comprises an error source, an error type, and an error time; retrieving an error correlation rule associated with the error information; determining if the error correlation rule is satisfied by the error information and information of other known errors; and identifying a common error zone based on the error information and the information of the other known errors.

Aspects of the present disclosure involve an innovative non-transitory computer readable medium, storing instructions for detecting error zones. The instructions may include creating a plurality of probe groups by iteratively creating a probe group when a volume group of a plurality of volume groups is deleted or created, wherein each of the plurality of probe groups comprises a primary volume, a secondary volume, and a path; detecting a new error associated with the plurality of probe groups and the plurality of volume groups; retrieving error information associated with the new error, wherein the error information comprises an error source, an error type, and an error time; retrieving an error correlation rule associated with the error information; determining if the error correlation rule is satisfied by the error information and information of other known errors; and identifying a common error zone based on the error information and the information of the other known errors.

Aspects of the present disclosure involve an innovative server system for detecting error zones. The server system may include creating a plurality of probe groups by iteratively creating a probe group when a volume group of a plurality of volume groups is deleted or created, wherein each of the plurality of probe groups comprises a primary volume, a secondary volume, and a path; detecting a new error associated with the plurality of probe groups and the plurality of volume groups; retrieving error information associated with the new error, wherein the error information comprises an error source, an error type, and an error time; retrieving an error correlation rule associated with the error information; determining if the error correlation rule is satisfied by the error information and information of other known errors; and identifying a common error zone based on the error information and the information of the other known errors.

Aspects of the present disclosure involve an innovative system for detecting error zones. The system can include means for creating a plurality of probe groups by iteratively creating a probe group when a volume group of a plurality of volume groups is deleted or created, wherein each of the plurality of probe groups comprises a primary volume, a secondary volume, and a path; means for detecting a new error associated with the plurality of probe groups and the plurality of volume groups; retrieving error information associated with the new error, wherein the error information comprises an error source, an error type, and an error time; means for retrieving an error correlation rule associated with the error information; means for determining if the error correlation rule is satisfied by the error information and information of other known errors; and means for identifying a common error zone based on the error information and the information of the other known errors.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 12 illustrates example tables applying the probe group allocation process shown in FIG. 11, in accordance with an example implementation.

DETAILED DESCRIPTION

Figure 1:
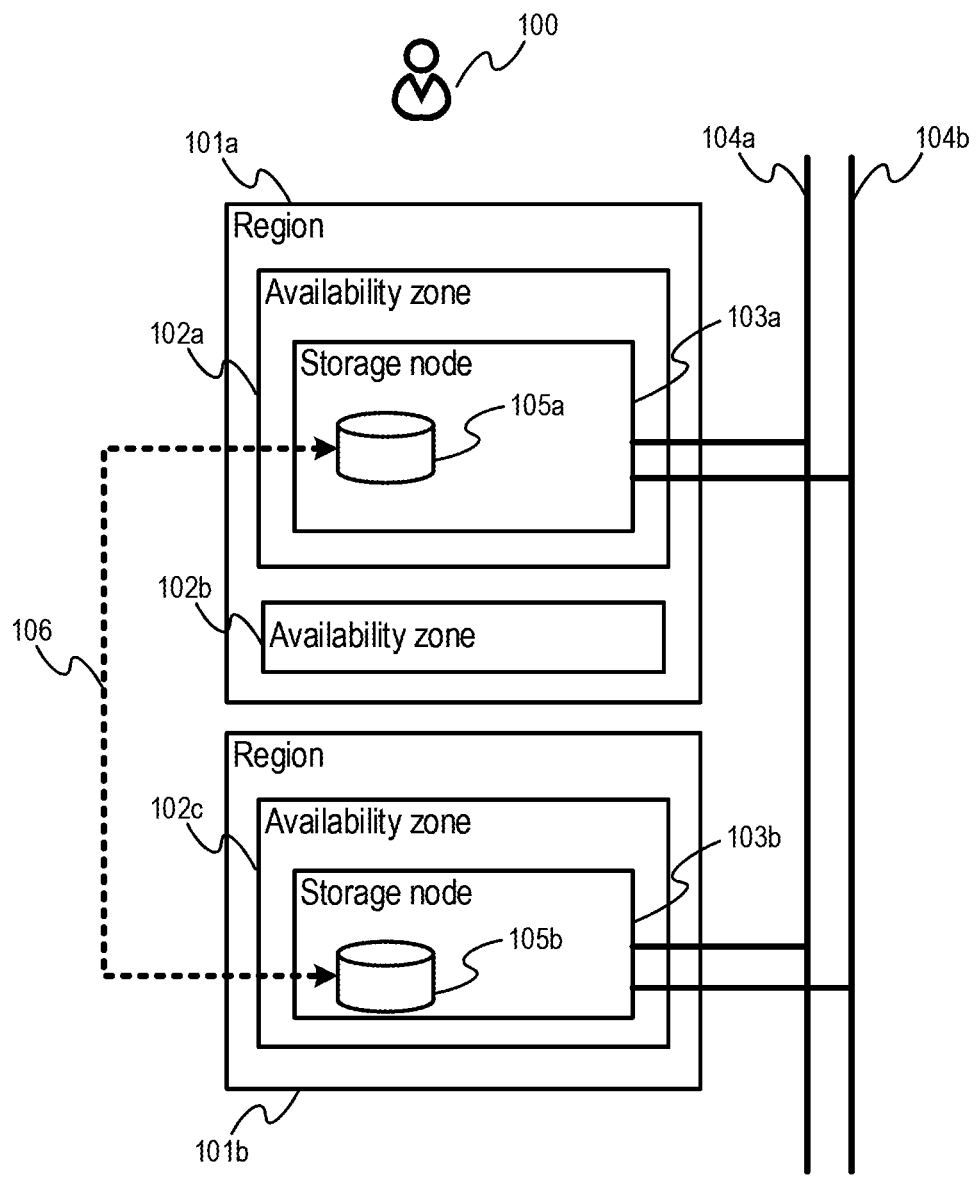
FIG. 1 illustrates a conventional disaster recovery system.

The following detailed description following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

A failure area identification system can be utilized to identify a failure area from errors of volume groups. The failure area can be either a region, an availability zone, or a path. The system incorporates probe groups to detect errors. The probe groups are similar to volume groups, which are created by the storage admin.

The system adds two processes to existing volume group management; specifically, an error correlation process and a probe group allocation process. The error correlation process is capable of detecting multiple errors from different probe groups and volume groups, finding correlation among these groups, and identifying common surrounding area as failure area. The probe group allocation process automatically deploys necessary probe groups in the cloud environment.

Figure 2:
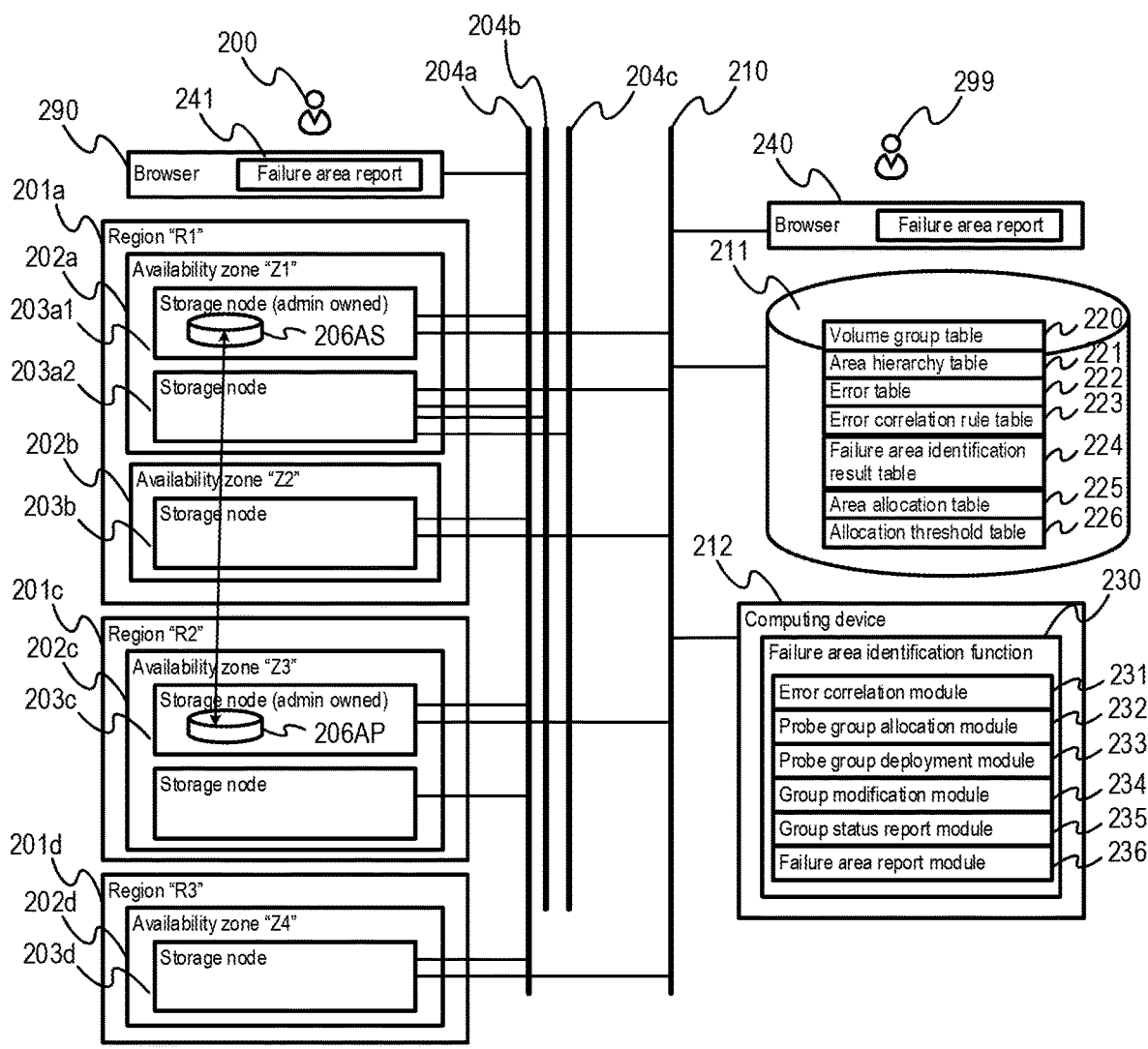
FIG. 2 illustrates an example system utilizing the error correlation process and the probe group allocation process, in accordance with an example implementation.

FIG. 2 illustrates an example system utilizing the error correlation process and the probe group allocation process, in accordance with an example implementation. Storage admin 200 has access to browser 290, regions 201a, 201c, and 201d on cloud, and network connectivity 204a, 204b, and 204c. Region "R1" 201a has availability zone "Z1" 202a and availability zone "Z2" 202b. Region "R2" 201c has availability zone "Z3" 202c. Region "R3" 201d has availability zone "Z4" 202d.

Storage nodes 203a1 and 203a2 reside in availability zone "Z1" 202a. Storage node 203b resides in availability zone "Z2" 202b. Storage node 203c resides in availability zone "Z3" 202c. Storage node 203d resides in availability zone "Z4" 202d. Storage admin 200 can create both storage nodes 203a and 203c. Volume groups 206AS and 206AP may be created by the storage admin 200.

Every storage node is connected to management network 210, browser 240, failure area identification database 211, and computing device 212. Failure area identification database 211 stores volume group table 220, area hierarchy table 221, error table 222, error correlation rule table 223, failure area identification result table 224, area allocation table 225, and allocation threshold table 226. Table 220-226 are described in more detail below.

Computing device 212 contains a failure area identification function 230. The failure area identification function 230 include components such as error correlation module 231, probe group allocation module 232, probe group deployment module 233, group modification module 234, group status report module 235, and failure area report module 236. The error correlation module 231 is used to find correlation among multiple errors from different storage nodes. The probe group allocation module 232 generates probe groups for error detection. The probe group deployment module 233 deploys probe groups in storage nodes for error detection. Browser 290 and browser 240 have failure area report 241 to report a result of failure area identification to storage admin 200 and hybrid cloud manager 299. The group status report module 235 functions as a trigger detector in the error correlation process. The failure area report module 236 reports output information (failure area) to browser/user interface during the final step of the error correlation process.

Figure 3:
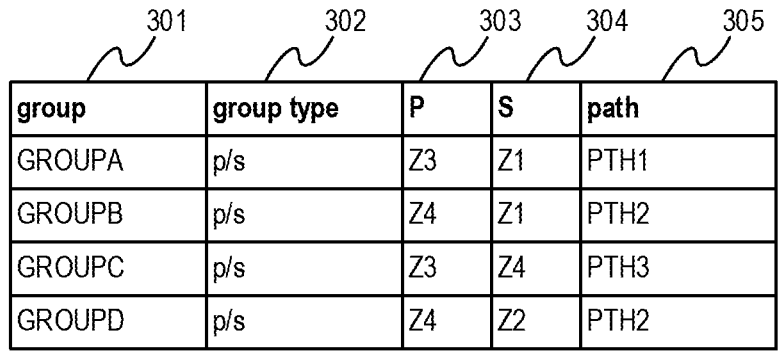
FIG. 3 illustrates an example of volume group table, in accordance with an example implementation.

FIG. 3 illustrates an example of volume group table 220, in accordance with an example implementation. The volume group table 220 stores profiles of volume groups in cloud environment. As illustrated in FIG. 3, the volume group table 220 stores information involving group 301, group type 302, P location 303, S location 304, and path 305. Each row in the volume group table 220 explains a profile of each volume group. Taking the first row as example, the volume group has the group name "GROUPA" and the group type "p/s". The volume group has P located in availability zone Z3, S located in availability zone Z1, and the path of "PTH1".

Figure 4:
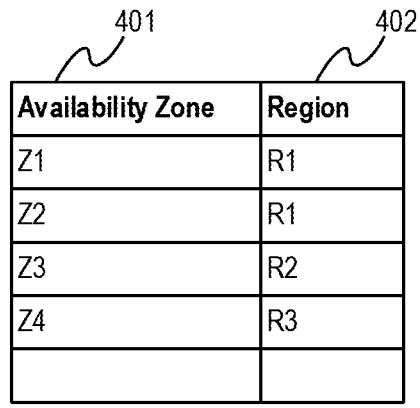
FIG. 4 illustrates an example of area hierarchy table, in accordance with an example implementation.

FIG. 4 illustrates an example of area hierarchy table 221, in accordance with an example implementation. The area hierarchy table 221 identifies the surrounding area a volume group is located. As illustrated in FIG. 4, the area hierarchy table 221 stores information involving availability zone 401 and region 402. Each entry in the area hierarchy table 221 is associated with an availability zone. Taking the first entry as example, the availability zone "Z1" is included in region "R1".

Figure 5:
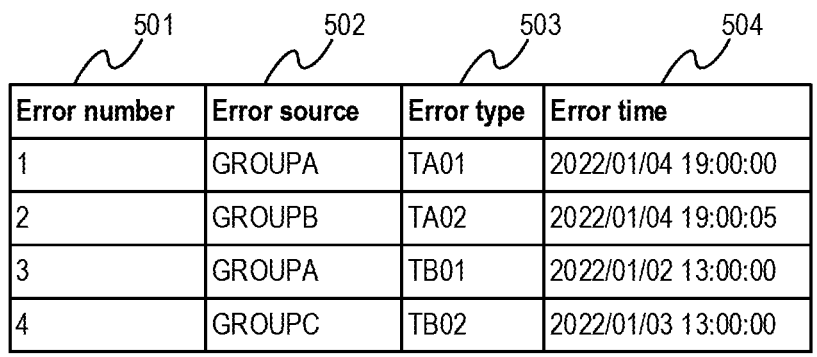
FIG. 5 illustrates an example of an error table, in accordance with an example implementation.

FIG. 5 illustrates an example of error table 222, in accordance with an example implementation. The error table 222 may be used to find correlation between errors and storage nodes. As illustrated in FIG. 5, the error table 222 may store information involving error number 501, error source 502, error type 503, and error time 504. Each entry in the error table 222 is associated with an identified error. Taking the first entry as example, error "1" occurred in the volume group "GROUPA" at the time of "2022/01/01 19:00:00", and has the error type "TA01".

Figure 6:
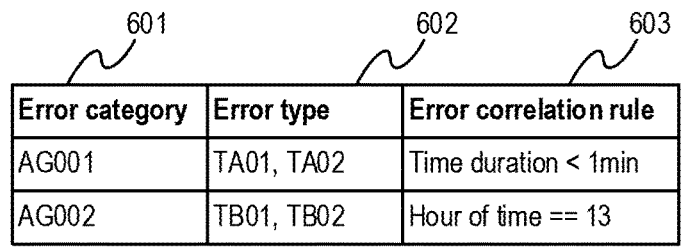
FIG. 6 illustrates an example of an error correlation rule table, in accordance with an example implementation.

FIG. 6 illustrates an example of error correlation rule table 223, in accordance with an example implementation. The error correlation rule table 223 stores rules used by the error correlation module 231 to find correlation among multiple errors from different storage nodes. The error correlation rule table 223 stores information involving error category 601, error type 602, and error correlation rule 603. Each entry in the error correlation rule table 223 is associated with a specific rule. For example, the first entry has "AG001" in error category, "TA01, TA02" in error type, and error correlation rule "time duration<1 min" in error correlation rule. This rule finds the correlation among error types "TA01" and "TA02", and checks if these errors meet a condition explained as "time duration<1 min".

Figure 7:
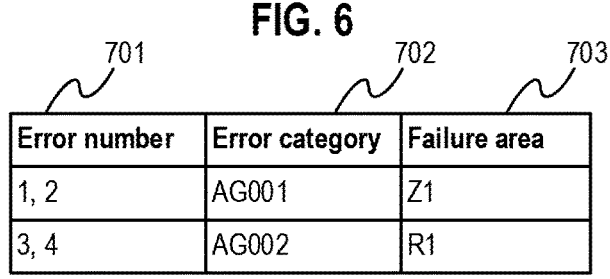
FIG. 7 illustrates an example of a failure area identification result table, in accordance with an example implementation.

FIG. 7 illustrates an example of failure area identification result table 224, in accordance with an example implementation. The failure area identification result table 224 stores results generated by the error correlation module 231 generates and each entry shows correlation between errors, associated categories, and identified failure area. The failure area identification result table 224 stores information involving error number 701, error category 702, and failure area 703. Application of the failure area identification result table 224 is described in detail below.

Figure 8:
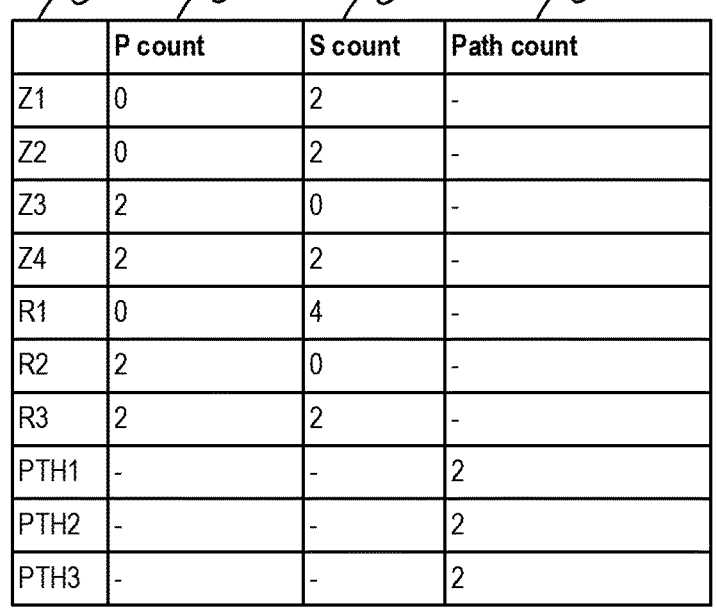
FIG. 8 illustrates an example of an area allocation table, in accordance with an example implementation.

FIG. 8 illustrates an example of area allocation table 225, in accordance with an example implementation. The area allocation table 225 stores information involving identifier 801, P count 802, S count 803, and path count 804. Application of the area allocation table 225 is described in detail below.

Figure 9:
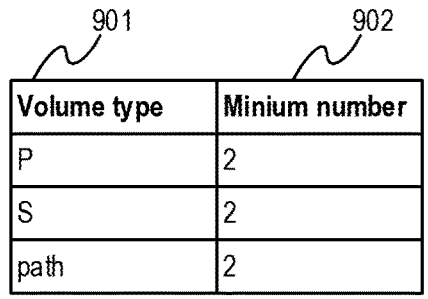
FIG. 9 illustrates an example of an allocation threshold table, in accordance with an example implementation.

FIG. 9 illustrates an example of allocation threshold table 226, in accordance with an example implementation. The allocation threshold table 226 stores threshold values used by the probe group allocation module 232. The allocation threshold table 226 stores information involving volume type 901 and minimum number 902. Application of the allocation threshold table 226 is described in detail below.

Figure 10:
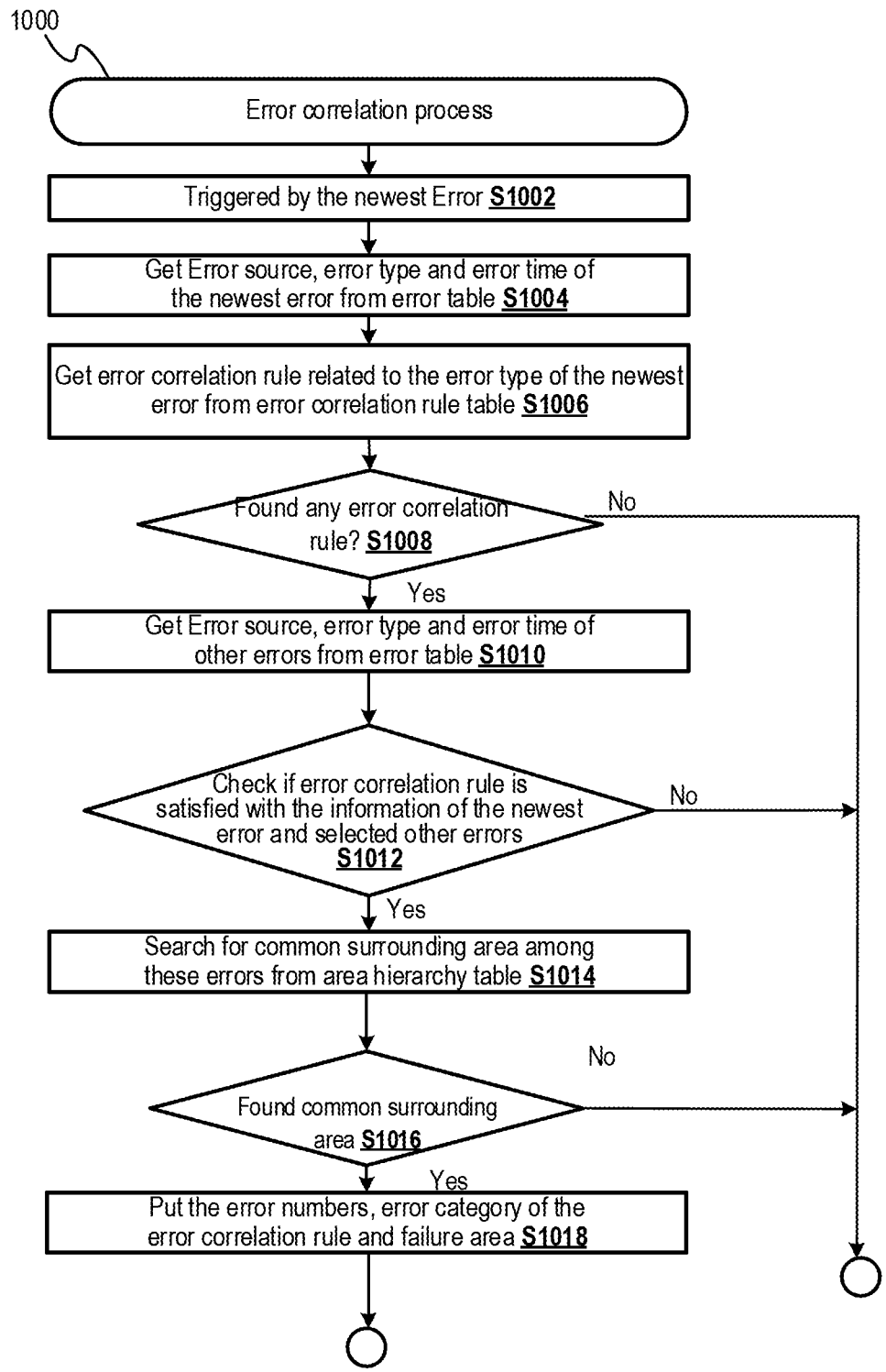
FIG. 10 illustrates an example process flow of the error correlation process, in accordance with an example implementation.

FIG. 10 illustrates an example process flow of the error correlation process 1000, in accordance with an example implementation. The error correlation process 1000 begins with the process triggered by a newest error in any volume group in the cloud environment at S1002. At S1004, the error correlation module 231 gets error source, error type, and error time of the newest error from error table 222. Take entry two of the newest error in error table 222 in FIG. 5 for example, error "2" has error source "GROUPB", error type "TA02", and an error timestamp of "2022/01/01 19:00:05".

At S1006, the error correlation module 231 receives error correlation rule associated with the error type of the newest error from error correlation rule table 223. For example, as illustrated in FIG. 6, the error correlation rule related to the error type "TA02" is the first entry with the error category of "AG001". The error correlation rule for the error category "AG001" is "Time duration<1 min".

At S1008, the error correlation module 231 checks if any related error correlation rule is found in the previous step. If an error correlation rule is found, then the process proceeds to S1010. Otherwise, the process comes to an end.

At S1010, the error correlation module 231 receives error source, error type, and error time of other errors from the error table 222. For example, entries associated with error numbers "1", "3", and "4" are retrieved from error table 222 as shown in FIG. 5.

At S1012, the error correlation module 231 checks if error correlation rule found in step S1008 is satisfied with the information of the newest error and selected other errors. Taking FIGS. 5 and 6 as example, the step checks whether the error correlation rule "Time duration<1 min" is satisfied by the newest error labeled as "2" and other errors labeled as "1", "3", and "4". For example, the timestamp of the newest error is "2022/01/01 19:00:05" and the timestamp of the error labeled as "1" is "2022/01/01 19:00:00". This error combination satisfies the rule because the two errors occurred 5 seconds apart and satisfies the less than a minute threshold indicated in the rule. The rule is not satisfied when the combination is that of the newest error and error labeled as "3" or the newest error and error labeled as "4". As a result, the error combination of the newest error and error labeled as "1" is selected.

At S1014, the error correlation module 231 searches for a common surrounding area among these identified errors. Using the volume group table 220 and the error table 222 illustrated in FIGS. 3 and 5, it is determined that the newest error occurred in availability zones Z4 and Z1 based on error source "GROUPB". On the other hand, the error labeled as "1" occurred in availability zones Z3 and Z1 based on error source "GROUPA". In this case, "Z1" is selected as the common surrounding area because both errors share the common availability zone Z1. In some example implementations, the common surrounding area may be a region instead of availability zone.

At S1016, a determination is made as to whether a common surrounding area is found. If the answer is no, then the process comes to a stop. If the answer is yes, then the process continues to S1018. At S1018, the error correlation module 231 puts/records error numbers of the identified errors, the error category whose error correlation rule is satisfied at S1012, and discovered common surrounding area. Taking FIG. 7 as example, the step puts/records error numbers "1" and "2" and error category "AG001" which have been found as satisfied at step S1012. The step then puts/records "Z1" which is selected at S1014 as common surrounding area. Using row two of FIG. 7 as another case, the step puts/records error numbers "3" and "4", error category "AG002", and failure area "R1" in the table.

Figure 11:
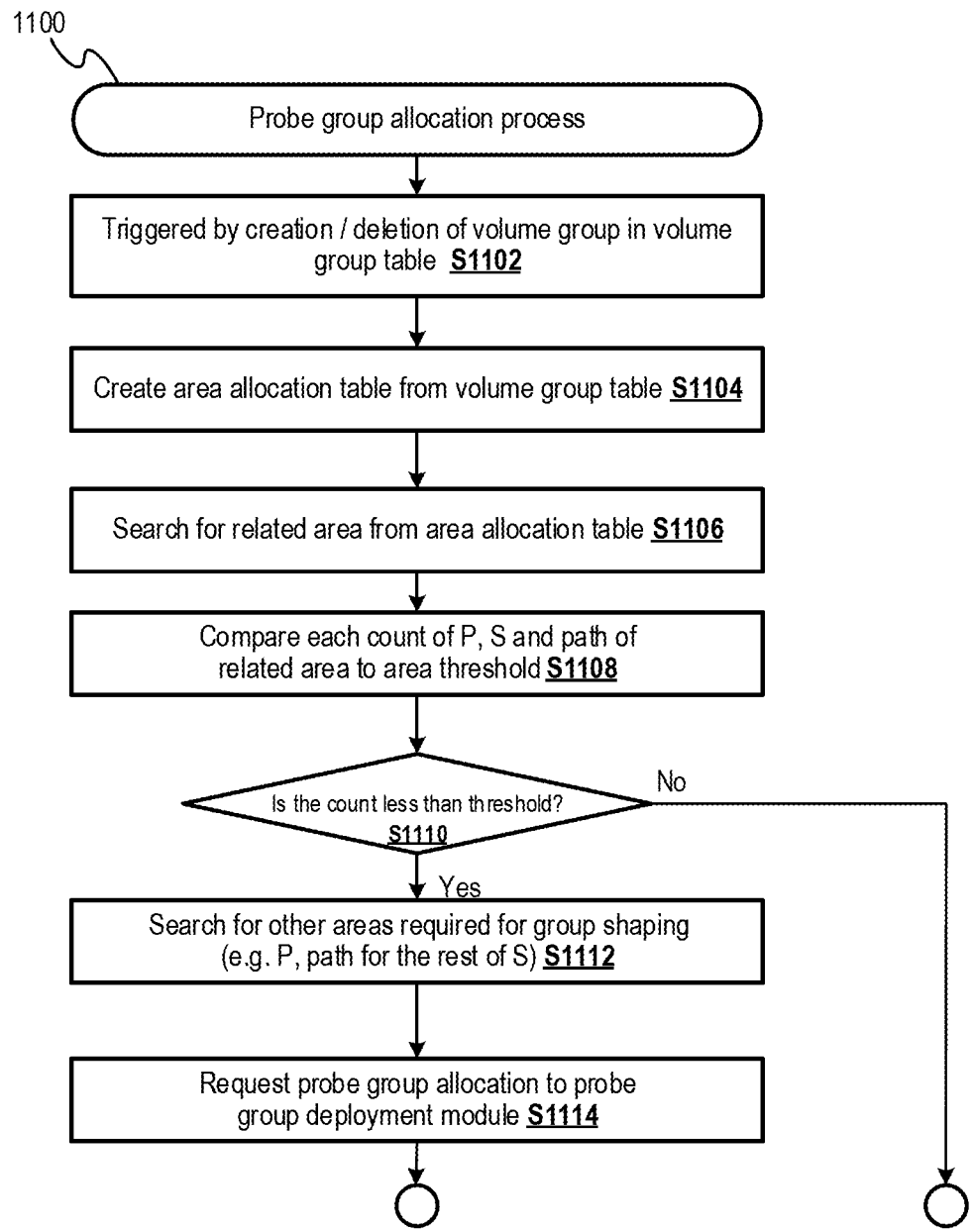
FIG. 11 illustrates an example process flow of a probe group allocation process, in accordance with an example implementation.

FIG. 11 illustrates an example process flow of probe group allocation process 1100, in accordance with an example implementation. As illustrated in FIG. 11, probe group allocation module 232 is triggered by creation or deletion of a volume group in volume group table 220 at S1102. This occurs when storage admin 200 creates or deletes a volume group in some of storage nodes in the cloud environment. The volume group which the storage admin 200 created or deleted is referred to as a "trigger volume group". FIG. 12 illustrates example tables applying the probe group allocation process shown in FIG. 11, in accordance with an example implementation. As illustrated in example volume group table 1201 of FIG. 12, "GROUPA" is set as the trigger volume group. In some example implementations, the probe group allocation process can be triggered by events other than volume group creation/deletion. For instance, changes in the cloud environment such as creation of a new availability zone in the cloud environment may trigger the probe group allocation process.

At S1104, the probe group allocation module 232 counts up current volume groups in each availability zone and fills up area allocation table 225 from volume group table 220. As illustrated in example area allocation table 1202 of FIG. 12, P, S, and path components in every area like Z1 and others are counted up. The example area allocation table 1202 shows that availability zone "Z1" has two counts of P and one count of S associated with it.

At S1106, the probe group allocation module 232 searches for counts of areas related to "trigger volume group" from the area allocation table 225. As illustrated in the example volume group table 1201 of FIG. 12, areas related to the trigger volume group "GROUPA" are "Z3" for P, "Z1" for S, and "PTH1" for path. The probe group allocation module 232 picked up a value "2" from the example area allocation table 1202 as "P" count for "Z3". It also picked up another value "1" from the example area allocation table 1202 as "S" count for "Z1". It also picked up another value "2" as "path" count of "PTH1".

At S1108, the probe group allocation module 232 compares each count of P, S, and path of related areas against area thresholds of allocation threshold table 226. As illustrated in the example allocation threshold table 1203 of FIG. 12, the threshold for each of P, S and path is "2". Probe group allocation module 232 then compares counts acquired in S1106 ("2", "1" and "2") against "2". Based on which, the probe group allocation module 232 finds that the S count of "1" is the only value less than the threshold.

At S1110, the probe group allocation module 232 checks to see if any count is less than the threshold. If the result is yes, the process proceeds to step S1112. Otherwise, the process comes to an end. As illustrated in FIG. 12, the S count of "1" is less than the threshold of "2". Therefore, it is decided that a probe group should be created, and that the probe group should have S volume in "Z1".

At S1112, the probe group allocation module 232 searches for other areas requiring group shaping. In the example, the probe group allocation module 232 searches for area candidates suitable to allocate both P and path. Example search table 1204 of FIG. 12 illustrates the search result. First, S volume is set to Z1 based on S1110. Next, P volume and S volume within a volume group should be located in different availability zones. Therefore, area candidates for P are Z2, Z3, and Z4. At the same time, it is desirable that probe volume groups and trigger volume group share least common locations. P of trigger volume group was Z3, thus area candidates are now reduced to Z2 and Z4. Lastly, it is desirable to have area selected such that counts in the example area allocation table 1202 are balanced equally. As shown in the example area allocation table 1202, the P count of Z4 is less than that of Z2. Therefore, taking area balancing into account, the P area candidate comes down to Z4. Applying the same strategy, PTH2 is selected as the path area candidate. As a result of the step, probe group allocation module 232 calculates the area for a new probe group where P is Z4, S is Z1, and the path is PTH2.

At S1114, the probe group allocation module 232 requests allocation of the probe group calculated in S1112 to the probe group deployment module 233. As illustrated in the example volume group table 1205 of FIG. 12, the probe group deployment module 233 automatically deploys P volume in a storage node in availability zone Z4. It deploys S volume in a storage node in availability zone Z1, and sets up these two volumes as volume group communicating each other via PTH2.

The foregoing example implementations may have various benefits and advantages. For example, by using the error correlation process, the failure in the availability zone or region can automatically be identified. Error correlation module can detect the correlation among errors which come from different probe groups and volume groups. It identifies a common surrounding area of these correlated errors as a failure area. Storage admin can then receive the result of identification of failure area and avoid unhealthy areas for volume group creation.

Figure 13:
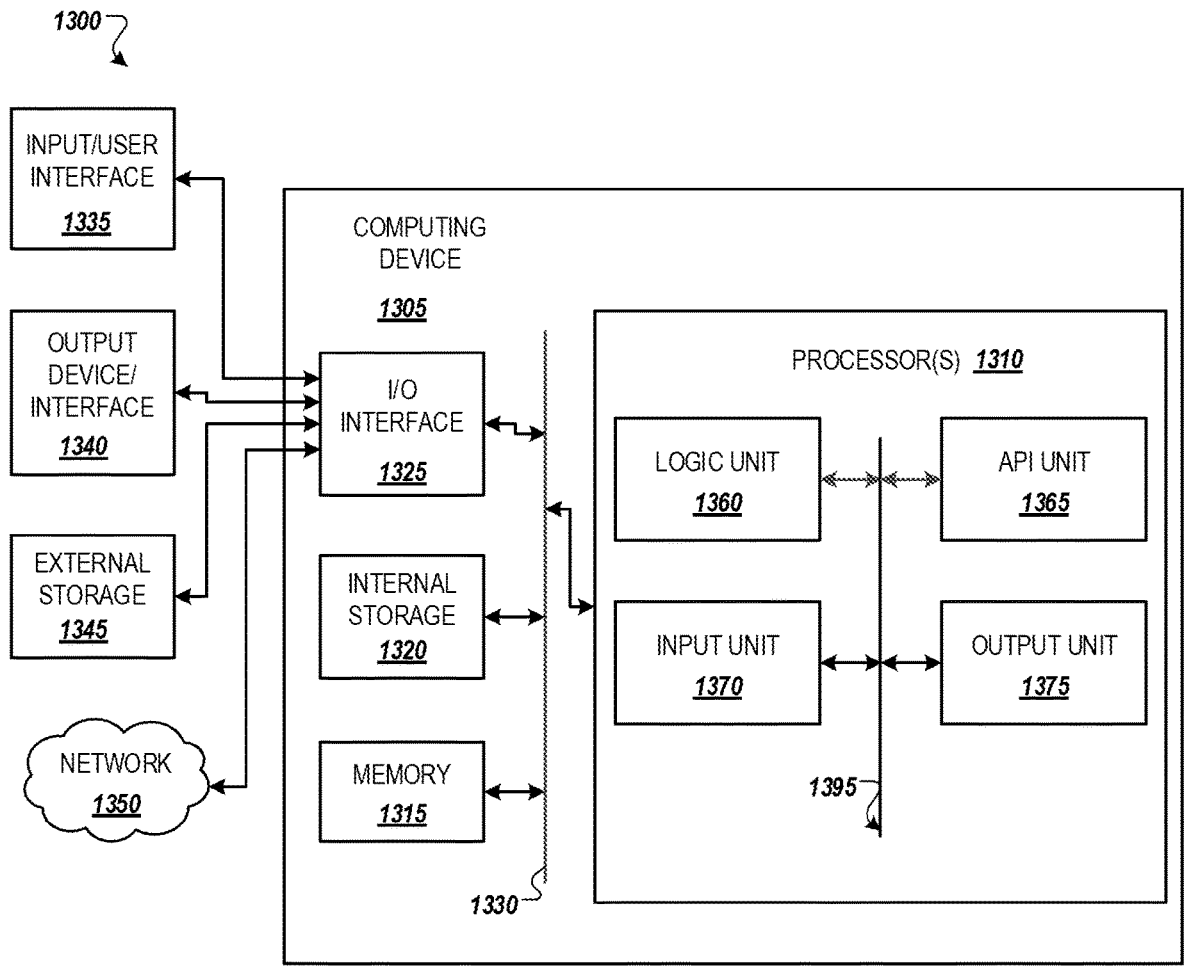
FIG. 13 illustrates an example computing environment with an example computer device suitable for use in some example implementations.

FIG. 13 illustrates an example computing environment with an example computer device suitable for use in some example implementations. Computer device 1305 in computing environment 1300 can include one or more processing units, cores, or processor(s) 1310, memory 1315 (e.g., RAM, ROM, and/or the like), internal storage 1320 (e.g., magnetic, optical, solid-state storage, and/or organic), and/or IO interface 1325, any of which can be coupled on a communication mechanism or bus 1330 for communicating information or embedded in the computer device 1305. IO interface 1325 is also configured to receive images from cameras or provide images to projectors or displays, depending on the desired implementation.

Computer device 1305 can be communicatively coupled to input/user interface 1335 and output device/interface 1340. Either one or both of the input/user interface 1335 and output device/interface 1340 can be a wired or wireless interface and can be detachable. Input/user interface 1335 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1340 may include a display, television, monitor, printer, speaker, braille, or the like. In some example implementations, input/user interface 1335 and output device/interface 1340 can be embedded with or physically coupled to the computer device 1305. In other example implementations, other computer devices may function as or provide the functions of input/user interface 1335 and output device/interface 1340 for a computer device 1305.

Examples of computer device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1305 can be communicatively coupled (e.g., via IO interface 1325) to external storage 1345 and network 1350 for communicating with any number of networked components, devices, and systems, including one or more computer devices of the same or different configuration. Computer device 1305 or any connected computer device can be functioning as, providing services of, or referred to as a server, client, thin server, general machine, special-purpose machine, or another label.

IO interface 1325 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1300. Network 1350 can be any network or combination of networks (e.g., the Internet, local area network, wide area network, a telephonic network, a cellular network, satellite network, and the like).

Computer device 1305 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1310 can execute under any operating system (OS) (not shown), in a native or virtual environment. One or more applications can be deployed that include logic unit 1360, application programming interface (API) unit 1365, input unit 1370, output unit 1375, and inter-unit communication mechanism 1395 for the different units to communicate with each other, with the OS, and with other applications (not shown). The described units and elements can be varied in design, function, configuration, or implementation and are not limited to the descriptions provided. Processor(s) 1310 can be in the form of hardware processors such as central processing units (CPUs) or in a combination of hardware and software units.

In some example implementations, when information or an execution instruction is received by API unit 1365, it may be communicated to one or more other units (e.g., logic unit 1360, input unit 1370, output unit 1375). In some instances, logic unit 1360 may be configured to control the information flow among the units and direct the services provided by API unit 1365, the input unit 1370, the output unit 1375, in some example implementations described above. For example, the flow of one or more processes or implementations may be controlled by logic unit 1360 alone or in conjunction with API unit 1365. The input unit 1370 may be configured to obtain input for the calculations described in the example implementations, and the output unit 1375 may be configured to provide an output based on the calculations described in example implementations.

Processor(s) 1310 can be configured to conduct creating a plurality of probe groups for error detection; detecting a new error associated with the plurality of probe groups and the plurality of volume groups; retrieving error information associated with the new error, wherein the error information comprises an error source, an error type, and an error time; retrieving an error correlation rule associated with the error information; determining if the error correlation rule is satisfied by the error information and information of other known errors; identifying a common zone based on the error information and the information of the other known errors as an error zone as shown in FIGS. 10 and 11.

Processor(s) 1310 can conduct the creating the plurality of probe groups comprises by creating the plurality of probe groups by iteratively creating a probe group when a volume group is deleted or created, wherein each of the plurality of probe groups comprises a primary volume, a secondary volume, and a path as shown in FIG. 11.

Processor(s) 1310 can conduct the creating a probe group when a volume group is deleted or created by generating area allocation information associated with the plurality of volume groups, the area allocation information comprises primary volume zone information, secondary volume zone information, and path information for each volume group of the plurality of volume groups, wherein the primary volume zone information comprises primary zone counts and primary region counts associated with zone and regions of the plurality of volume zone groups identified as primary, the secondary volume zone information comprises secondary zone counts and secondary region counts associated with zones and regions of the plurality of volume zone groups identified as secondary, and the path information comprises path counts associated with paths of the plurality of volume zone groups; identifying, when the volume group is deleted or created, a primary zone count from the primary zone counts that is associated with the volume group, a secondary zone count from the secondary zone counts that is associated with the volume group, and a path count from the path counts that is associated with the volume group; comparing each count of the identified primary zone count, the identified secondary zone count, and identified path count against predetermined thresholds; searching, based on the comparing, for zones and paths that require group reshaping; and creating the probe group based on the zones and the paths that require group reshaping from the search as shown in FIG. 11.

Processor(s) 1310 can conduct the retrieving the error correlation rule associated with the error information by identifying the error correlation rule that corresponds to the error type from error correlation information, wherein the error correlation information comprises error category, error type, and error correlation rule as shown in FIG. 6.

Processor(s) 1310 can conduct the determining if the error correlation rule is satisfied by the error information and the information of other known errors by identifying error information associated with the other known errors; determining if the error correlation rule is satisfied by the error information associated with the new error and a part of the identified error information associated with the other known errors; and if the error correlation rule is satisfied, identifying at least one of the other known errors associated with the part of the identified error information as shown in FIGS. 5 and 6.

The processor(s) 1310 may be configured to conduct creating a plurality of probe groups by iteratively creating a probe group when a volume group of a plurality of volume groups is deleted or created, wherein each of the plurality of probe groups comprises a primary volume, a secondary volume, and a path; detecting a new error associated with the plurality of probe groups and the plurality of volume groups; retrieving error information associated with the new error, wherein the error information comprises an error source, an error type, and an error time; retrieving an error correlation rule associated with the error information; determining if the error correlation rule is satisfied by the error information and information of other known errors; identifying a common zone based on the error information and the information of the other known errors as an error zone as shown in FIGS. 10 and 11.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for detecting error zones from a plurality of volume groups, the method comprising:
   creating a plurality of probe groups for error detection;
   detecting a new error associated with the plurality of probe groups and the plurality of volume groups;
   retrieving error information associated with the new error, wherein the error information comprises an error source, an error type, and an error time;
   retrieving an error correlation rule associated with the error information;
   determining if the error correlation rule is satisfied by the error information and information of other known errors; and
   identifying a common zone based on the error information and the information of the other known errors as an error zone,
   wherein the creating the plurality of probe groups comprises creating the plurality of probe groups by iteratively creating a probe group when a volume group is deleted or created, wherein each of the plurality of probe groups comprises a primary volume, a secondary volume, and a path, and
   wherein the creating a probe group when a volume group is deleted or created further comprises:
      generating area allocation information associated with the plurality of volume groups, the area allocation information comprises primary volume zone information, secondary volume zone information, and path information for each volume group of the plurality of volume groups, wherein the primary volume zone information comprises primary zone counts and primary region counts associated with zone and regions of the plurality of volume zone groups identified as primary, the secondary volume zone information comprises secondary zone counts and secondary region counts associated with zones and regions of the plurality of volume zone groups identified as secondary, and the path information comprises path counts associated with paths of the plurality of volume zone groups;
      identifying, when the volume group is deleted or created, a primary zone count from the primary zone counts that is associated with the volume group, a secondary zone count from the secondary zone counts that is associated with the volume group, and a path count from the path counts that is associated with the volume group;
      comparing each count of the identified primary zone count, the identified secondary zone count, and identified path count against predetermined thresholds;
      searching, based on the comparing, for zones and paths that require group reshaping; and
      creating the probe group based on the zones and the paths that require group reshaping from the search.

2. The method of claim 1, wherein for each of the plurality of probe groups, a zone associated with a primary volume is different from a zone associated with a secondary volume.

3. The method of claim 2, the retrieving the error correlation rule associated with the error information comprises:
   identifying the error correlation rule that corresponds to the error type from error correlation information, wherein the error correlation information comprises error category, error type, and error correlation rule.

4. The method of claim 3, the determining if the error correlation rule is satisfied by the error information and the information of other known errors comprises:
   identifying error information associated with the other known errors;
   determining if the error correlation rule is satisfied by the error information associated with the new error and a part of the identified error information associated with the other known errors; and
   if the error correlation rule is satisfied, identifying at least one of the other known errors associated with the part of the identified error information.

5. The method of claim 4, the information of the other known errors comprises error source information, error type information, and error time information.

6. A non-transitory computer readable medium, storing instructions for detecting error zones from a plurality of volume groups, the instructions comprising:
   creating a plurality of probe groups for error detection;
   detecting a new error associated with the plurality of probe groups and the plurality of volume groups;
   retrieving error information associated with the new error, wherein the error information comprises an error source, an error type, and an error time;
   retrieving an error correlation rule associated with the error information;
   determining if the error correlation rule is satisfied by the error information and information of other known errors; and
   identifying a common zone based on the error information and the information of the other known errors as an error zone,
   wherein the creating the plurality of probe groups comprises creating the plurality of probe groups by iteratively creating a probe group when a volume group is deleted or created, wherein each of the plurality of probe groups comprises a primary volume, a secondary volume, and a path, and
   wherein the creating a probe group when a volume group is deleted or created further comprises:
      generating area allocation information associated with the plurality of volume groups, the area allocation information comprises primary volume zone information, secondary volume zone information, and path information for each volume group of the plurality of volume groups, wherein the primary volume zone information comprises primary zone counts and primary region counts associated with zone and regions of the plurality of volume zone groups identified as primary, the secondary volume zone information comprises secondary zone counts and secondary region counts associated with zones and regions of the plurality of volume zone groups identified as secondary, and the path information comprises path counts associated with paths of the plurality of volume zone groups;
      identifying, when the volume group is deleted or created, a primary zone count from the primary zone counts that is associated with the volume group, a secondary zone count from the secondary zone counts that is associated with the volume group, and a path count from the path counts that is associated with the volume group;

comparing each count of the identified primary zone count, the identified secondary zone count, and identified path count against predetermined thresholds;

searching, based on the comparing, for zones and paths that require group reshaping; and creating the probe group based on the zones and the paths that require group reshaping from the search.

7. The non-transitory computer readable medium of claim 6, wherein for each of the plurality of probe groups, a zone associated with a primary volume is different from a zone associated with a secondary volume.

8. The non-transitory computer readable medium of claim 7, the retrieving the error correlation rule associated with the error information comprises:

identifying the error correlation rule that corresponds to the error type from error correlation information, wherein the error correlation information comprises error category, error type, and error correlation rule.

9. The non-transitory computer readable medium of claim 8, the determining if the error correlation rule is satisfied by the error information and the information of other known errors comprises:

identifying error information associated with the other known errors;

determining if the error correlation rule is satisfied by the error information associated with the new error and a part of the identified error information associated with the other known errors; and if the error correlation rule is satisfied, identifying at least one of the other known errors associated with the part of the identified error information.

10. The non-transitory computer readable medium of claim 9, the information of the other known errors comprises error source information, error type information, and error time information.

11. A method for detecting error zones, the method comprising:

creating a plurality of probe groups by iteratively creating a probe group when a volume group of a plurality of volume groups is deleted or created, wherein each of the plurality of probe groups comprises a primary volume, a secondary volume, and a path;

detecting a new error associated with the plurality of probe groups and the plurality of volume groups;

retrieving error information associated with the new error, wherein the error information comprises an error source, an error type, and an error time;

retrieving an error correlation rule associated with the error information;

determining if the error correlation rule is satisfied by the error information and information of other known errors; and identifying a common zone based on the error information and the information of the other known errors as an error zone, wherein the creating a probe group when a volume group is deleted or created further comprises:

generating area allocation information associated with the plurality of volume groups, the area allocation information comprises primary volume zone information, secondary volume zone information, and path information for each volume group of the plurality of volume groups, wherein the primary volume zone information comprises primary zone counts and primary region counts associated with zone and regions of the plurality of volume zone groups identified as primary, the secondary volume zone information comprises secondary zone counts and secondary region counts associated with zones and regions of the plurality of volume zone groups identified as secondary, and the path information comprises path counts associated with paths of the plurality of volume zone groups;

identifying, when the volume group is deleted or created, a primary zone count from the primary zone counts that is associated with the volume group, a secondary zone count from the secondary zone counts that is associated with the volume group, and a path count from the path counts that is associated with the volume group;

comparing each count of the identified primary zone count, the identified secondary zone count, and identified path count against predetermined thresholds;

searching, based on the comparing, for zones and paths that require group reshaping; and creating the probe group based on the zones and the paths that require group reshaping from the search.

12. The method of claim 11, wherein for each of the plurality of probe groups, a zone associated with a primary volume is different from a zone associated with a secondary volume.

13. The method of claim 12, the retrieving the error correlation rule associated with the error information comprises:

identifying the error correlation rule that corresponds to the error type from error correlation information, wherein the error correlation information comprises error category, error type, and error correlation rule.

14. The method of claim 13, the determining if the error correlation rule is satisfied by the error information and the information of other known errors comprises:

identifying error information associated with the other known errors;

determining if the error correlation rule is satisfied by the error information associated with the new error and a part of the identified error information associated with the other known errors; and if the error correlation rule is satisfied, identifying at least one of the other known errors associated with the part of the identified error information.

15. The method of claim 14, the information of the other known errors comprises error source information, error type information, and error time information.

\* \* \* \* \*